(12) United States Patent
Nakamura et al.

(10) Patent No.: US 9,939,926 B2
(45) Date of Patent: Apr. 10, 2018

(54) POINTING DEVICE FOR A PORTABLE COMPUTER INCLUDING MULTIPLE PRESSURE SENSORS LOCATED BELOW A KEYBOARD PLATE

(71) Applicant: LENOVO (SINGAPORE) PTE. LTD., Singapore (SG)

(72) Inventors: Fusanobu Nakamura, Yamato (JP); Mitsuhiro Yamazaki, Yokohama (JP); Akihiko Mizutani, Kanagawa-ken (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 157 days.

(21) Appl. No.: 15/016,001

(22) Filed: Feb. 4, 2016

(65) Prior Publication Data

US 2016/0224131 A1 Aug. 4, 2016

(30) Foreign Application Priority Data

Feb. 4, 2015 (JP) .................................. 2015-019947

(51) Int. Cl.
*G06F 3/033* (2013.01)
*G09G 5/08* (2006.01)
*G06F 3/0354* (2013.01)

(52) U.S. Cl.
CPC ........ *G06F 3/0354* (2013.01); *G06F 3/03543* (2013.01)

(58) Field of Classification Search
None
See application file for complete search history.

(56) References Cited

U.S. PATENT DOCUMENTS 5,889,507 A 3/1999 Engle et al.
7,321,361 B2 * 1/2008 Sato .................. G06F 3/044
345/173
(Continued)

FOREIGN PATENT DOCUMENTS

JP 02141816 5/1990
JP 02222019 A 9/1990
(Continued)

OTHER PUBLICATIONS

Dictionary.com definition of stud, http://www.dictionary.com/browse/stud?s=t, p. 1.*

*Primary Examiner* — Ilana Spar
*Assistant Examiner* — Kirk Hermann
(74) *Attorney, Agent, or Firm* — Russell Ng PLLC; Antony P. Ng (57) ABSTRACT

A pointing device is disclosed. The pointing device includes an operation cap having an operation surface fitted into a stud. The stud is fixed to a keyboard plate with a screw from below together with a sensor plate. A waterproof material is provided between the stud and the keyboard plate. Multiple pressure sensors are arranged below the keyboard plate. The pressure sensors are applied with a predetermined pressure beforehand. When the operation surface is depressed, the stud and the sensor plate slide and move downward while being tilted to reduce the detection pressures of the pressure sensors. Since the pressure sensors exist below the keyboard plate, the operation cap can be downsized, and the pressure sensors can be protected from impact to the operation cap.

9 Claims, 9 Drawing Sheets (56) References Cited

U.S. PATENT DOCUMENTS

| | | | |
|---|---|---|---|
| 2001/0015720 A1* | 8/2001 | Inukai | G06F 1/1616 |
| | | | 345/161 |
| 2004/0201606 A1* | 10/2004 | Ito | G06F 3/0338 |
| | | | 715/702 |
| 2010/0026626 A1* | 2/2010 | Macfarlane | G06F 3/0219 |
| | | | 345/160 |

FOREIGN PATENT DOCUMENTS

| JP | 06309095 A | 11/1994 |
|---|---|---|
| JP | 08022376 | 1/1996 |
| JP | 09244801 A | 9/1997 |
| JP | 2000242417 | 9/2000 |
| JP | 2005190353 | 7/2005 |
| JP | 2011232947 | 11/2011 |

\* cited by examiner

POINTING DEVICE FOR A PORTABLE COMPUTER INCLUDING MULTIPLE PRESSURE SENSORS LOCATED BELOW A KEYBOARD PLATE

PRIORITY CLAIM

The present application claims benefit of priority under 35 U.S.C. § 120, 365 to the previously filed Japanese Patent Application No. JP2015-019947 with a priority date of Feb. 4, 2015, which is incorporated by reference herein.

BACKGROUND OF THE INVENTION

1. Technical Field

The present invention relates to pointing devices for electronic devices in general, and particularly to a pointing device for moving a cursor on a display of a portable electronic device.

2. Description of Related Art

A pointing device of a computer generates a signal for moving a mouse pointer or cursor on a display according to a user's operation, and generates a selection signal for the position of the mouse pointer according to a selection operation. Pointing devices include a pointing stick as well as a mouse and a touch-pad. The pointing stick is also called Track Point®, and is provided among keys on a keyboard. The pointing stick is mainly employed in a laptop personal computer (laptop PC) because the pointing stick can be operated with fingers in a home position. Unlike a mouse, a pointing stick requires no operation space and it is easy to operate even with one hand while keeping a computer on a user's lap.

Figure 8A:
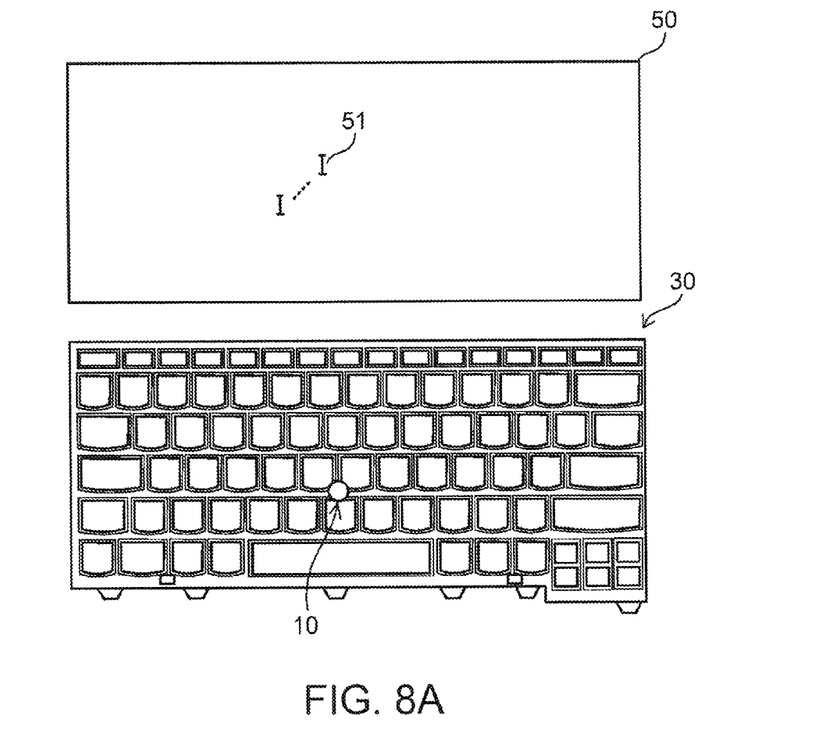
FIG. 8A is a diagram of a portable computer having a pointing device.
Figure 8B:
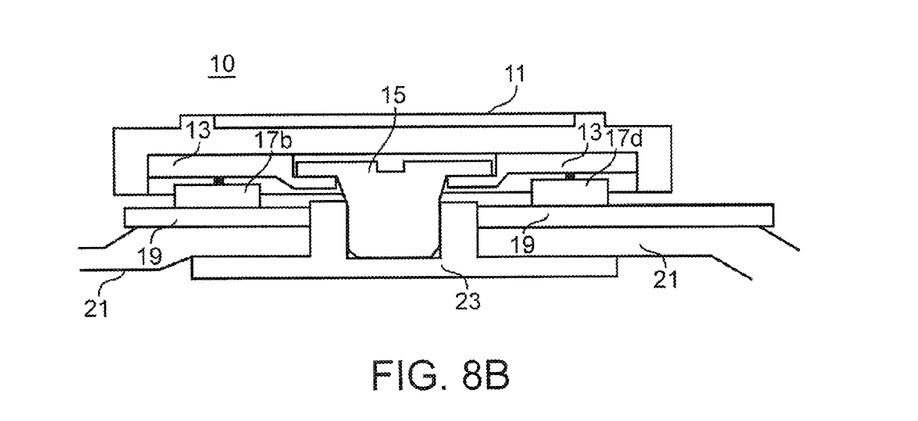
FIG. 8B is a sectional view depicting the structure of a pointing device to be compared with that of the present invention.
Figure 9A:
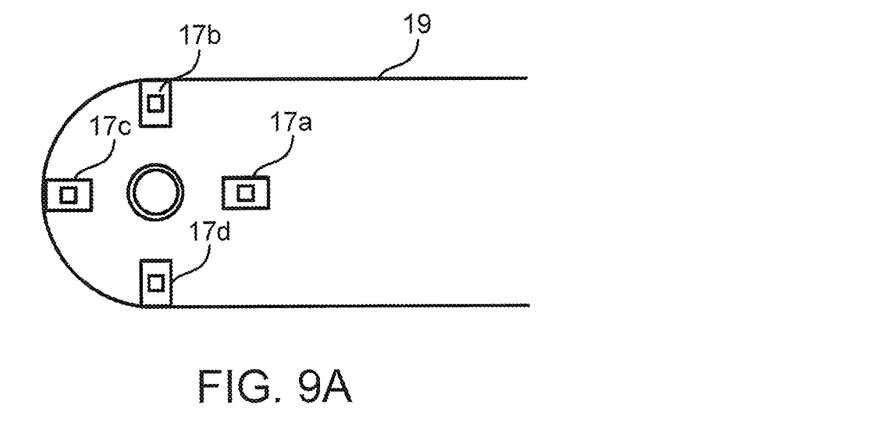
FIGS. 9A-9B are sectional views depicting the structure of the pointing device to be compared with that of the present invention.
Figure 9B:
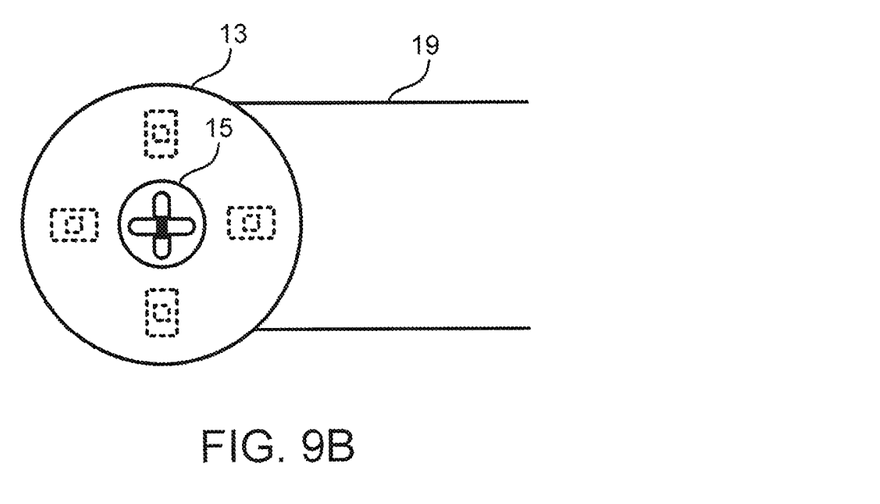

A pressure sensor type and a strain gauge type are known as detection principles of a pointing stick. A pressure sensor type pointing device 10 that can be installed in a laptop PC is shown in FIGS. 8A-8B and 9A-9B. FIG. 8A is a diagram showing a display 50 and a keyboard assembly 30 that constitute a laptop PC. FIG. 8B is a sectional view of the pointing device 10. FIG. 9A is a plan view showing pressure sensors 17a-17d that constitute the pointing device 10, and FIG. 9B shows a state where a sensor plate 13 with an operation cap 11 removed therefrom is fixed to a keyboard plate 21 with a screw 15 from above.

A mouse cursor 51 is displayed on the display 50. The pointing device 10 is arranged among G, H, and B keys, which is roughly at the center of the keyboard assembly 30, so that the pointing device 10 can be operated with one index finger in such a state that fingers are placed in the home position of the keyboard. The keyboard assembly 30 is made up by laminating, on the upper surface of a metal keyboard plate 21, a membrane sheet (not shown) with embedded key switches corresponding to respective keys.

Each key is fixed to the keyboard plate 21 to operate each key switch in the membrane sheet when the key is depressed. The pointing device 10 includes the operation cap 11, the sensor plate 13, and a flexible printed circuit board (FPC board) 19 with the pressure sensors 17a-17d mounted thereon.

The sensor plate 13 is fixed to the keyboard plate 21 using a stud 23 and a screw 15. The operation cap 11 is fitted in a manner to be removable from the keyboard plate 21. In the pointing device 10, the pressure sensors 17a-17d detect pressure when a pressing operation is performed on the upper surface of the operation cap 11 to generate a signal for determining the moving speed and moving direction of the mouse cursor 51.

Although such a pointing device 10 is suitable for making the keyboard assembly 30 thinner, further improvements can be made. For example, since there is a gap between the operation cap 11 or the sensor plate 13 and the FPC board 19, there is a possibility of causing short circuit in the FPC board 19 when water spills over the keyboard assembly 30. Next, when an excess pressing force is applied to the operation cap 11, there is a possibility that the force will be transmitted directly to the pressure sensors 17a-17d, causing the pressure sensors 17a-17d to break down. Further, since the pressure sensors 17a-17d are arranged above the keyboard plate 13, there is a limit to reducing the planar size and height of the operation cap 11.

Consequently, it would be desirable to provide an improved pointing device without the above-mentioned problems.

SUMMARY OF THE INVENTION

In accordance with a preferred embodiment of the present invention, a pointing device includes an operation cap arranged above a keyboard plate, multiple pressure sensors arranged below the keyboard plate, and a stud for reducing, from an initial pressure, a detection pressure of each of the multiple pressure sensors, in response to a pressing operation to the operation cap. Since the pressure sensors detect decrements from the initial pressure in response to the pressing operation, impact resistance for an impact applied to the operation cap is improved.

Alternatively, the pointing device includes an operation cap arranged above a keyboard plate, multiple pressure sensors arranged below the keyboard plate, and a stud for supporting the operation cap and transmitting, to the multiple pressure sensors, a change in pressing force to the operation cap. Since the pressure sensors are arranged below the keyboard plate, the size of the operation cap in the planar direction can be reduced and the height above the keyboard plate can also be reduced. A waterproof material for preventing a liquid from entering via a gap between the stud and the keyboard plate may also be provided. This waterproof material can be formed as an elastic body to restore, to the initial state, the position of the operation cap when the pressure to the operation cap is released.

When the operation cap is depressed, the stud slides in the pressing direction to enable the pressure applied to each of the multiple pressure sensors to be reduced from the initial pressure. Thus, the pressure of the pressure sensors is reduced even when the impact is applied to the operation cap, and this prevents the pressure sensors from being broken down. When the operation cap is depressed, the central axis of the stud can be tilted to increase the detection pressure of one pressure sensor from the initial pressure and increase the detection pressure of the other pressure sensor from the initial pressure. Further, a sensor plate fixed to the stud can be arranged below the keyboard plate to arrange a cushioning material between the sensor plate and the multiple pressure sensors. The cushioning material can cushion the impact applied to the pressure sensors through the operation cap.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
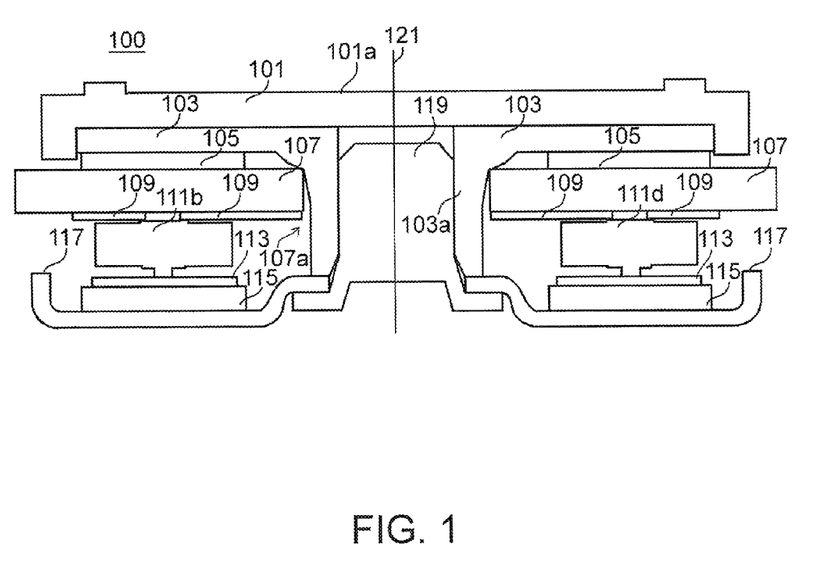
FIG. 1 is a sectional view of the structure of a pointing device.
Figure 2:
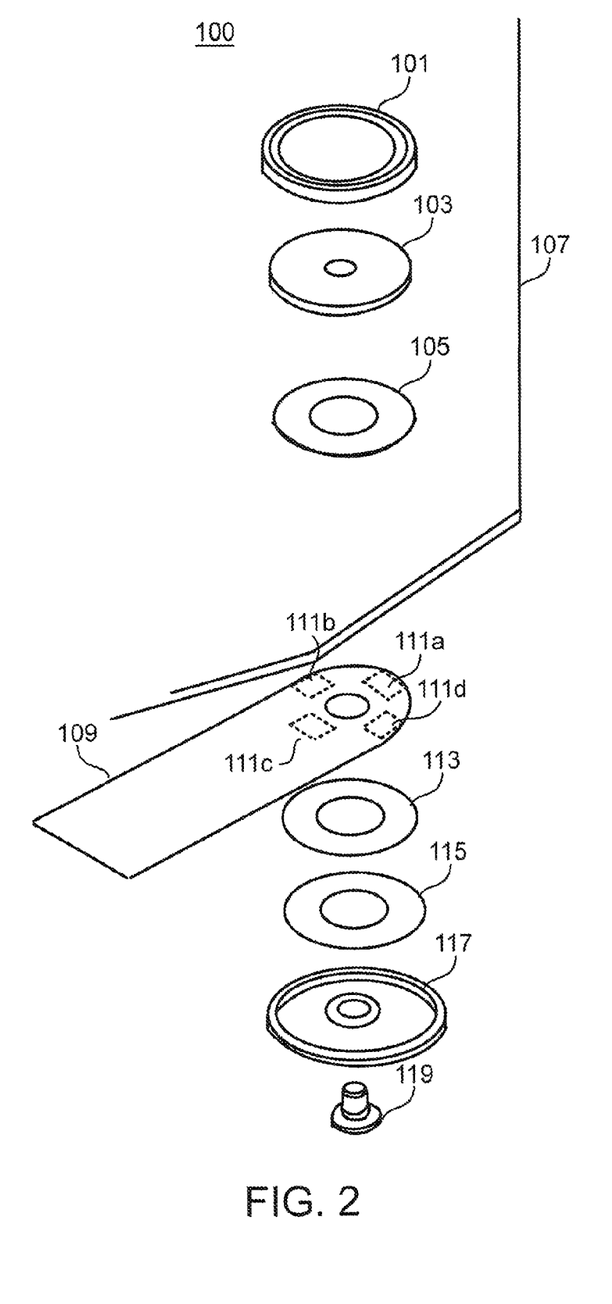
FIG. 2 is an exploded view of the pointing device from FIG. 1.

Referring now to the drawings and in particular to FIG. 1, there is depicted a sectional view for describing an outline of a pressure sensor type pointing device 100, and FIG. 2 is an exploded perspective view of the pointing device 100. The pointing device 100 can be mounted on the keyboard assembly 30 shown in FIG. 8 in place of the pointing device 10. The pointing device 100 is formed as a laminated body composed of an operation cap 101, a stud 103, a waterproof material 105, an FPC board 109 with pressure sensors 111a to 111d mounted thereon, a contact plate 113, a cushioning material 115, and a sensor plate 117 from above.

In this laminated body, the stud 103 is fixed with a screw 119 to the keyboard plate 107 together with the sensor plate 117 from the bottom to sandwich the keyboard plate 107 between the waterproof material 105 and the FPC board 109. As an example, the operation cap 101 is totally made of plastic. The top of the operation cap 101 forms an operation surface 101a having a planarly round shape. The operation surface 101a can be almost flush with or lower than the top of each key. Since the operation cap 101 is surrounded by three keys to keep out a finger from the sides thereof, only a pressing operation to the operation surface 101a in the pressing direction (downward) is allowed.

The stud 103 is made of metal, and the planar shape thereof is round so that the inside of the operation cap 101 can be fitted in the stud 103. In the stud 103, a through hole formed in a central protrusion 103a is tapped so that the stud 103 can be coupled to the keyboard plate 107 with the screw 119. The protrusion 103a penetrates through a through hole 107a of the keyboard plate 107. A coupling body made up of the operation cap 101, the stud 103, the sensor plate 117, and the screw 119 slides downward or rotates with respect to the through hole 107a in response to a pressing operation to the operation surface 101a. When the coupling body rotates, a central axis 121 of the coupling body is tilted.

The annular waterproof material 105 is formed as an elastic body made of rubber or urethane foam to prevent a liquid from entering the inside through a gap between the stud 103 and the keyboard plate 107. The waterproof material 105 formed as the elastic body maintains the sealing effect even when the stud 103 is tilted. The waterproof material 105 reduces a force applied to the pressure sensors 101a to 101d to protect the pressure sensors 101a to 101d when impact is applied to the operation surface 101a. When the pressing force to the operation surface 101a is released, the waterproof material 105 restores the posture of the stud 103 to an initial state. Here, the initial state is a state where there is no pressing operation to the operation surface 101a.

As an example, the four pressure sensors 111a to 111d and a logic circuit 251 (FIG. 4) are mounted on the FPC board 109. The pressure sensors 111a to 111d are arranged radially around the central axis 121 of the pointing device 100. Although the number of pressure sensors is not particularly limited as long as it is three or more, it is desired to select the number of pressure sensors in a range of three to five in terms of the space and cost. In an example, each of the pressure sensors 111a to 111d includes a piezoelectric element inside a cubic housing to output a voltage signal corresponding to pressure applied to a rod. It is desired that the pressure sensors 111a to 111d all have the same pressure-voltage characteristic.

The annular contact plate 113 is made of plastic to transmit, to the rod of each of the pressure sensor 111a to 111d, a change in pressure applied through the cushioning material 115. In addition to the pressing force for an operation, unexpected impact may be applied to the operation cap 101. When the position of the central axis 121 of the operation surface 101a is a point of application of the force of impact, the stud 103 only slides and hence no force of impact is transmitted to each of the pressure sensor 111a to 111d.

When the point of application of the force of impact is closer to the periphery than to the central axis 121, the stud 103 rotates and hence the force of impact is transmitted to any of the pressure sensors. Even in this case, when the sliding action is involved together with the rotating action at the same time, the force of impact is reduced by that amount. The annular cushioning material 115 formed as the elastic body made of rubber or urethane foam reduces a force when the force of impact is applied to any of the pressure sensors 111a to 111d by the rotating action to protect the pressure sensor. In an example, the tightening pressure of the screw 119 is so adjusted that an initial pressure, which is about half of the allowable pressure of each pressure sensor, will be applied equally to the pressure sensors 111a to 111d at the time of assembling the stud 103. In the initial state, the central axis 121 of the stud 103 is nearly perpendicular to the surface of the keyboard plate 107.

The annular sensor plate 117 is made of metal and fixed to the protrusion 103a of the stud 103 with the screw 119. The sensor plate 117 is formed as a member different from the stud 103 so that the stud 103 can be coupled to the keyboard plate 107 with the screw 119. The sensor plate 117 transmits, to each of the pressure sensors 111a to 111d through the cushioning material 115, a change in force generated while the stud 103 slides and rotates due to the pressing operation. Note that the structure and materials of the pointing device 100 described above are just an example, and are not to limit the scope of the present invention. The scope of the present invention is set forth in Claims.

In the pointing device 100, since the screw 119 couples the stud 103 and the sensor plate 117 as one body from below to fix the body to the keyboard plate 107, the head of the screw is not seen even when the operation cap 101 is removed. Therefore, since the body cannot be detached from the keyboard plate 107 unless the keyboard assembly 30 is removed from the chassis, it is difficult for average users to access the internal structure. Since the pressure sensors 111a to 111d are all arranged below the keyboard plate 107, the height of the pointing device 100 on the upper side of the keyboard plate 107 can be reduced compared with the conventional ones.

Figure 3:
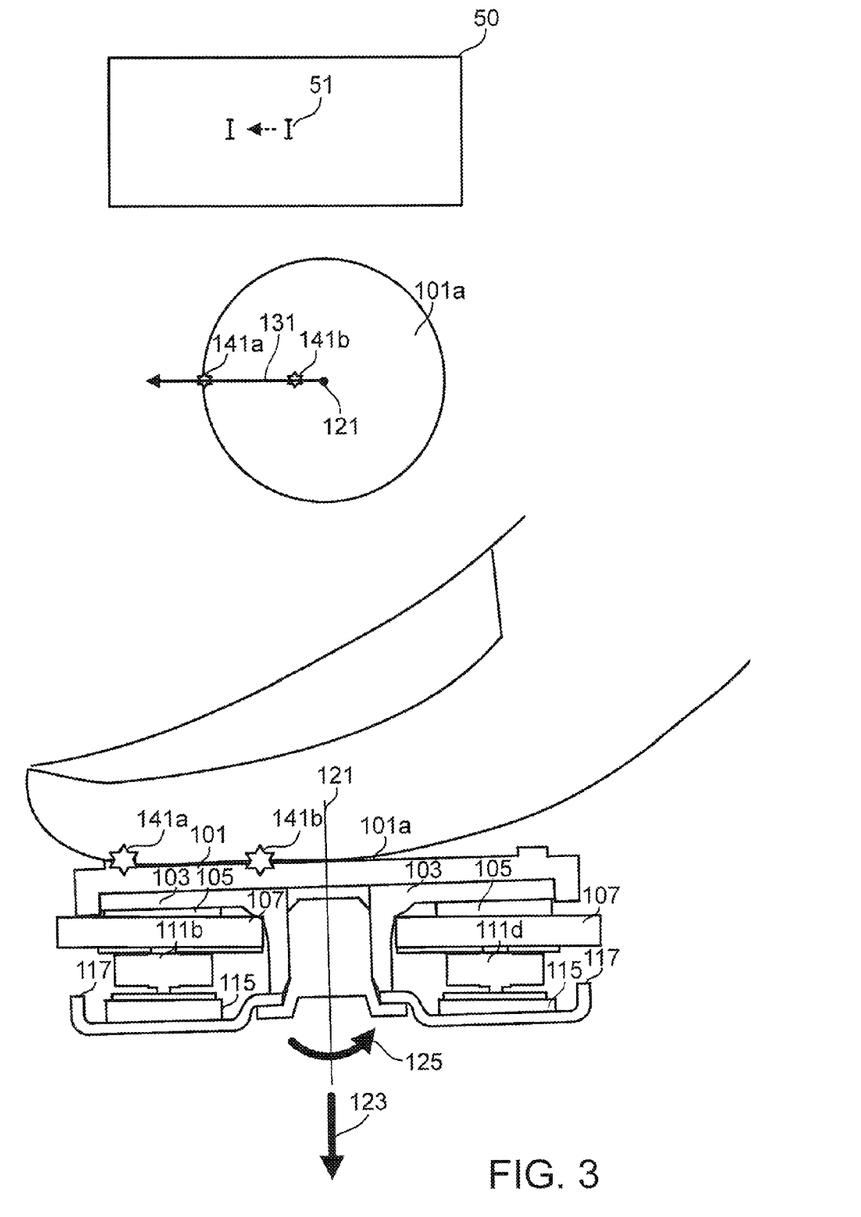
FIG. 3 is a diagram describing the behavior of the pointing device from FIG. 1.

FIG. 3 is a diagram for describing the behavior of the pointing device 100 when a pressing operation to the operation surface 101a is performed to move the mouse cursor 51 displayed on the display 50 leftward. A user can associate the moving direction of the mouse cursor 51 with the position of the pressing operation on the operation surface 101a, around the central axis 121. On the pointing device 100, a moving operation for moving the mouse cursor 51 with a pressing operation to the operation surface 101a and a selection operation for selecting an object displayed on the display 50 can be performed.

Since the moving operation is required to generate information corresponding to the moving direction and the moving speed of the mouse cursor 51, it is desired to depress an outer peripheral portion of the operation surface 101a. In the moving operation, the detection pressures of the pressure sensors 111a to 111d are increased or decreased from the initial pressure depending on the point of application on the operation surface 101a due to the pressing operation. In the selection operation, a portion in the neighborhood of the central axis 121 of the operation surface 101a is depressed to obtain a detection pressure different from that in the moving operation. In the selection operation, the detection pressures of all the pressure sensors 111a to 111d become nearly equal to one another and lower than the initial pressure.

The user who has associated the moving direction of the mouse cursor 51 with a direction indicated by an arrow 131 on the operation surface 101a performs such a pressing operation that any position in the direction of the arrow 131 from the central axis 121 to the periphery will be the point of application. At this time, since the ball of a finger is larger than the area of the operation surface 101a, the point of application may be a position 141a near the periphery or a position 141b near the central axis. A component of the sliding action of the coupling body including the stud 103 in the direction of an arrow 123 becomes large as the point of application is close to the central axis 121 like the position 141b, while a component of the rotating action of the coupling body in the direction of an arrow 125 becomes large as the point of application is close to the periphery like the position 141a.

When the point of application matches the central axis 121, the pointing device 100 only slides. The pointing device 100 can also be designed only to rotate when the point of application is in a position closest to the periphery of the operation surface 101a. In normal operations, the sliding action and the rotating action occur coincidentally according to the position of the point of application. A pressing operation in which the point of application is in any position in the direction of the arrow 131 from the central axis 121 to the outside matches the intention of the user to move the mouse cursor 51 leftward.

FIG. 3 shows a state in which the central axis 121 of the stud 103 is slightly tilted in the direction of the pressure sensor 111b (leftward) from the initial state. In response to this, the sensor plate 117 is also tilted to transmit an amount of change in force to the pressure sensors 111a to 111d through the cushioning material 115. In this case, a decrement in the detection pressure of the pressure sensor 111b located just under the depressed position is largest. Further, the smallest decrement or an increment in detection pressure is produced in the pressure sensor 111d located in a position opposite to the pressure sensor 111b. The detection pressures of the other pressure sensors 111a and 111c are also increased or decreased with respect to the initial pressure depending on the depressed position. At this time, since the waterproof material 105 is elastically deformed even when the stud 103 is tilted in either direction not to cause any gap between the stud 103 and the keyboard plate 107, a liquid can be prevented from entering through the through hole 107a of the keyboard plate 107.

As will be described later, information on the moving direction of the mouse is cursor 51 is also generated from the detection pressures of the four pressure sensors 111a to 111d in the embodiment. The moving direction of the mouse cursor 51 is required to match the direction of the point of application on the operation surface 101a with respect to the central axis 121. In order to enhance operability, the pressure sensors need to be separated a predetermined distance from one another. In such a case, if the pressure sensors 111a to 111d are arranged above the keyboard plate 107, the arrangement and size of the pressure sensors will limit the planar size of the operation cap 101.

In the embodiment, since the pressure sensors 111a to 111d are arranged below the keyboard plate 107, the planar size of the operation cap 101 can be reduced without being affected by the arrangement of the pressure sensors 111a to 111d. In the selection operation, since the stud 103 slides downward while keeping the central axis 121 of the stud 103 nearly perpendicular to the keyboard plate 107 like in the initial state, the detection pressures of all the pressure sensors 111a to 111d are reduced substantially equally.

Figure 4:
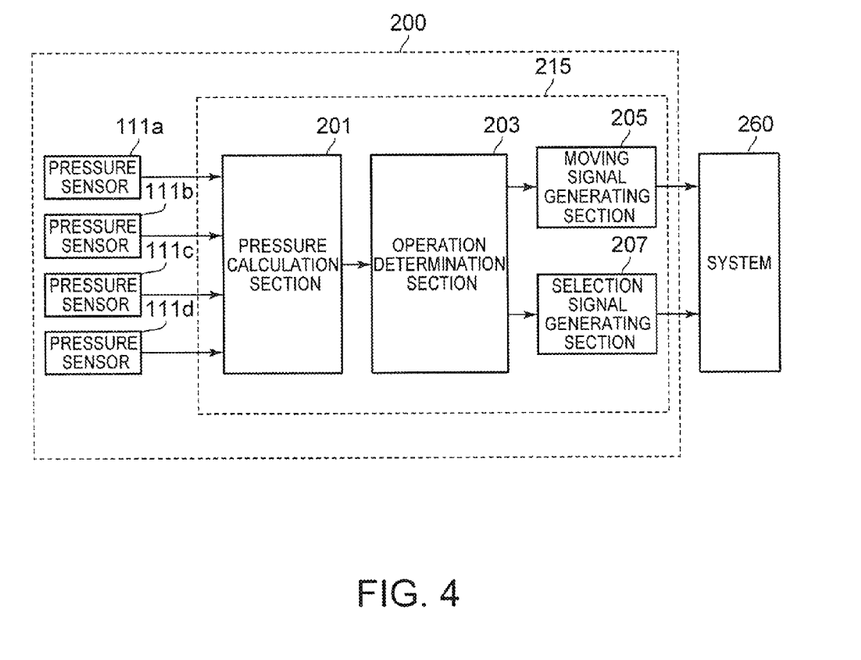
FIG. 4 is a block diagram of an input system having the pointing device from FIG. 1.
Figure 5A:
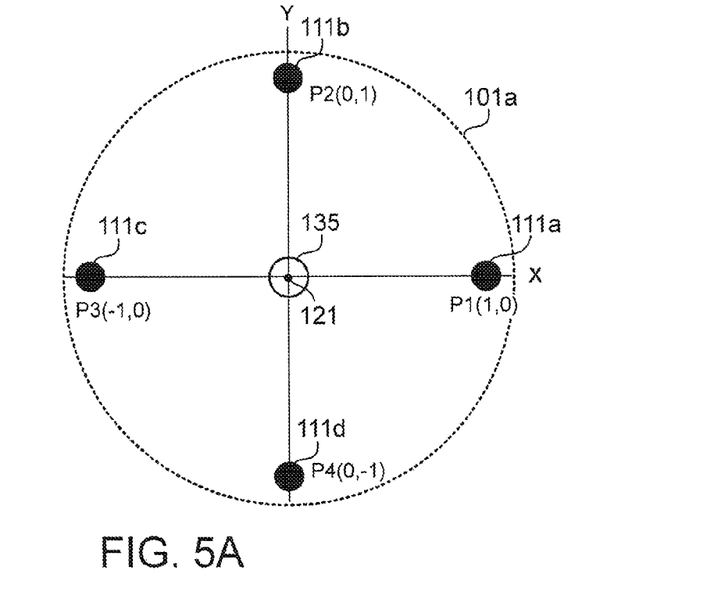
FIGS. 5A-5B are diagrams for describing an initial state and detection pressures in response to a moving operation.

FIG. 4 is a functional block diagram for describing an example of an input system 200 composed of the pressure sensors 111a to 111d and the logic circuit 251 mounted on the FPC board 109. A pressure calculation section 201 generates digital pressure data from analog detection pressures output from the pressure sensors 111a to 111d. In the initial state, the pressure sensors 111a to 111d output the initial pressure. The pressure calculation section 201 sets a pressure range of initial state values (initial pressure range 135) around the initial pressure as shown in FIG. 5A.

When a variation in detection pressure from pressure data on the four pressure sensors 111a to 111d exceeds the initial pressure range 135, an operation determination section 203 outputs the pressure data. When a difference between variations in detection pressure is larger than a predetermined value, the operation determination section 203 determines that a user is performing a moving operation, and sends the pressure data to a moving signal generating section 205. When the difference between variations in detection pressure is smaller than the predetermined value, the operation determination section 203 determines that the user is performing a selection operation, and sends the pressure data to a selection signal generating section 207.

When determining that the detection pressures of all the pressure sensors 111a to 111d fall within the initial pressure range 135, the operation determination section 303 stops outputting the pressure data to the moving signal generating section 205, and sends a cancellation signal to the selection signal generating section 207 if needed. From the pressure data received from the operation determination section 203, the moving signal generating section 205 generates a moving signal for moving the mouse cursor 51, and outputs the moving signal to a system 260.

From the pressure data received from the operation determination section 203, the selection signal generating section 207 generates a selection signal, and outputs the selection signal to the system 260. The selection signal generating section 207 stops outputting the selection signal in response to the cancellation signal received from the operation determination section 203. The system 260 is composed of hardware resources, such as a CPU, a system memory, a peripheral device, and the like, and software resources of a laptop PC, such as a device driver, an operating system, an application program, and the like.

FIGS. 5A-5B, 6A-8B and 7 are diagrams describing a state in which the moving signal generating section 205 generates a cursor moving signal when a moving operation is performed. The operation determination section 203 and the moving signal generating section 205 define two-dimensional X-Y coordinates having the central axis 121 of the radially arranged pressure sensors 111a to 111d as the origin of the coordinates. The operation determination section 203 and the moving signal generating section 205 set the detection pressures of the pressure sensors 111a to 111d and the coordinates thereof as P1(1, 0), P2(−1, 0), P3(0, 1), and P4(0, −1), and set initial pressures P1 to P4 to respective original points.

Figure 5B:
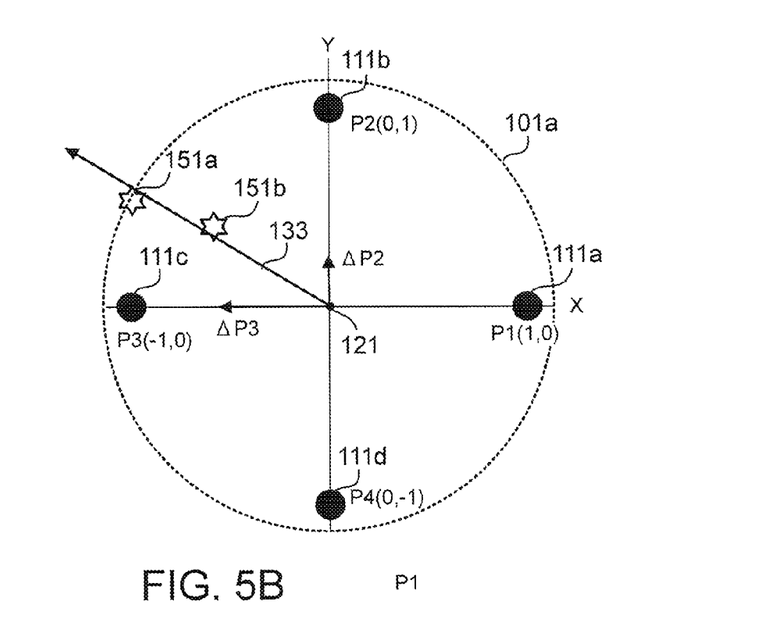
Figure 6A:
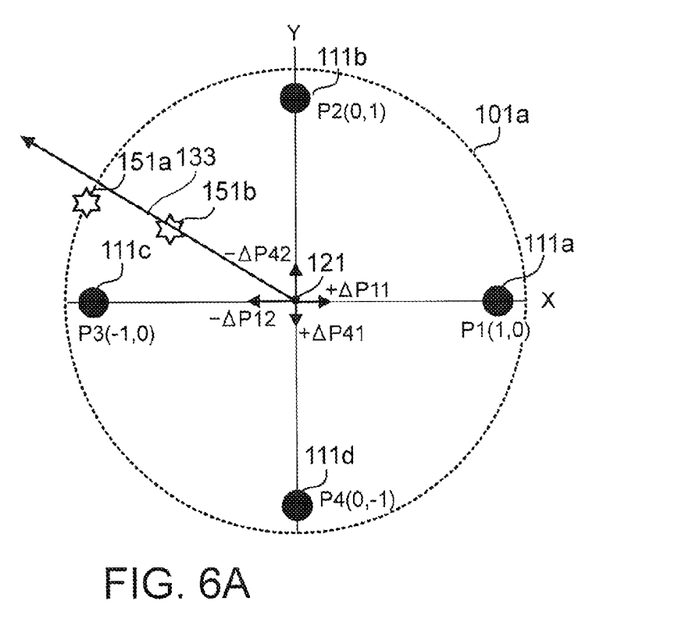
FIGS. 6A-6B are diagrams for describing detection pressures in response to a moving operation.
Figure 6B:
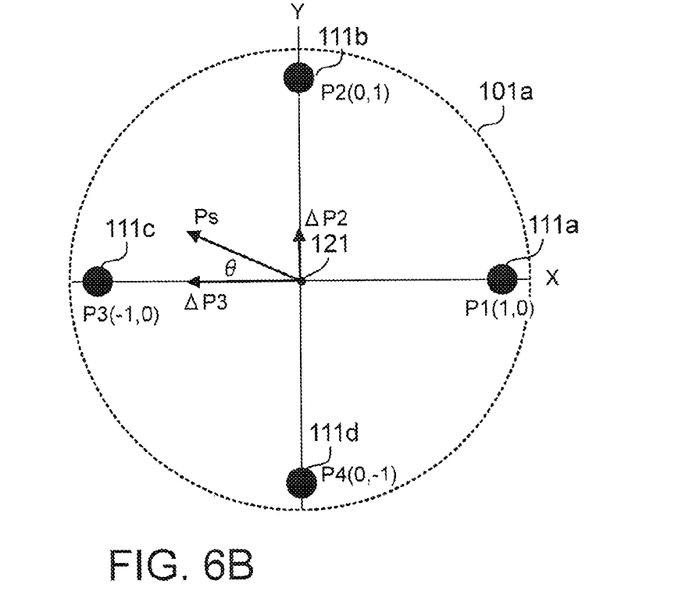

The moving signal generating section 205 sets, to respective original points, the detection pressures of the pressure sensors 111a to 111d in the initial state periodically or each time the input system 200 is reset. FIG. 5A, FIG. 5B, and FIG. 6A, FIG. 6B vectorially show variations of the detection pressures from the initial pressures. In FIG. 5A corresponding to the initial state, since the variations of the detection pressure P1 to P4 of the respective pressure sensors 111a to 111d fall within the initial pressure range 135, it shows that no moving signal and no selection signal are generated. FIG. 5B, FIG. 6A, and FIG. 6B show decrements ΔP1 to ΔP4 of the detection pressures P1 to P4 from the initial pressures when the user performs a pressing operation in the direction of an arrow 133 to move the mouse cursor 51.

The decrements ΔP1 to ΔP4 are set by setting a direction from the origin 121 and in which each of the pressure sensors 111a to 111d is arranged as a plus direction of the pressure sensor. As previously described, the point of application of a pressing operation to generate a moving signal indicative of the direction of the arrow 133 may be a position 151a close to the periphery of the operation surface 101a, or a position 151b close to the central axis 121. In either case, the moving signal generating section 205 is required to generate a moving signal indicative of the direction of the arrow 133.

In FIG. 5B, only the decrement ΔP3 of the pressure sensor 111c and the decrement ΔP2 of the pressure sensor 111b are shown as vectors. The variations of the detection pressures of the pressure sensors 111a and 111d at this time decrease or increase from the initial pressures depending on the point of application. FIG. 6A vectorially shows that the detection pressure of the pressure sensor 111a is between decrement +ΔP11 and increment −ΔP12, and the detection pressure of the pressure sensor 111d is between increment +ΔP41 and increment −ΔP42.

Among the detection pressures of the four pressure sensors 111a to 111d, the larger decrements ΔP2 and ΔP3 of the two pressure sensors 111b and 111c reflect the user's manipulating intent. However, the moving direction of the mouse cursor 51 intended by the user cannot be determined from the decrements ΔP4 and ΔP1 of the two pressure sensor 111d and 111a acted in concert with the pressure sensors 111b and 111c as described with reference to FIG. 6A. Therefore, the moving signal generating section 205 extracts two pressure sensor with larger decrements in detection pressure. In this example, the pressure sensors 111b and 111c are selected.

As shown in FIG. 6B, the moving signal generating section 205 sets an X-axial force Fx in terms of the decrements ΔP3 and ΔP2 of the selected two pressure sensors 111c and 111b as Fx=ΔP3, and a Y-axial force Fy as Fy=ΔP2. The moving signal generating section 205 identifies, as a moving speed, the absolute value of a resultant force Ps as a result of vector calculation of Fx and Fy, and identifies, as a moving direction, an angle Θ calculated from the resultant force Ps and Fx or Fy. The moving signal generating section 205 generates a moving signal for moving the mouse cursor 51 at a speed corresponding to the magnitude of the resultant force Ps in the vector direction of the resultant force Ps.

The pointing device 100 associates a moving amount S of the mouse cursor 51 per unit time with the absolute value of the resultant force Ps using a function of S=M(Ps) to achieve a good operational feeling. For example, if the moving amount S is set as the number of pulses within a predetermined time period, the system can make one pulse correspond to a certain moving distance to reflect the moving speed. The pointing device 100 sends the system 260 an X-axial moving amount Sx=S×(Fx/Ps) and a Y-axial moving amount Sy=S×(Fy/Ps). For example, the system 260 that received the moving amounts Sx and Sy can move the mouse cursor 51 from the current position in the direction of the angle Θ by an amount S=M(Ps) per unit time.

Figure 7:
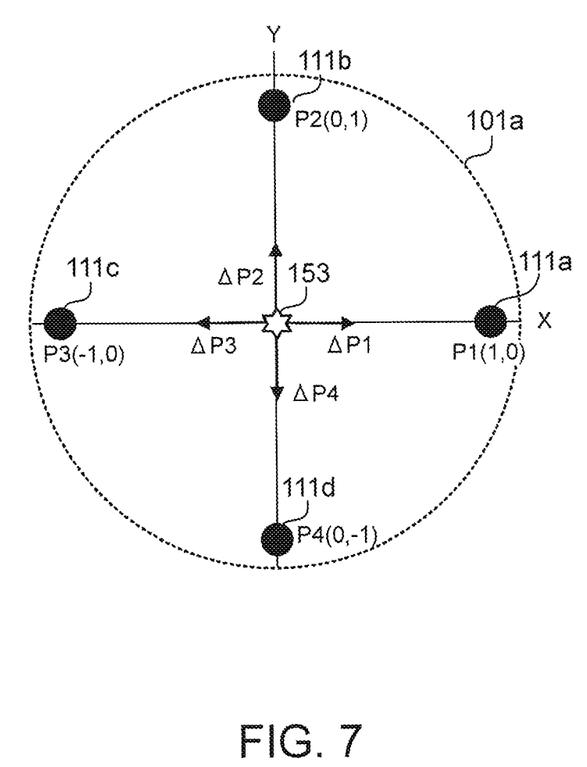
FIG. 7 is a diagram for describing detection pressures in response to a selection operation.

FIG. 7 shows the decrements ΔP1 to ΔP4 of the detection pressures P1 to P4 when a selection operation having the central axis 121 as a point of application 153 is performed. In the selection operation, the respective decrements of the detection pressures of the pressure sensors 111a to 111d are nearly equal to one another. When the pressure sensors 111a to 111d do not exist on the X axis and the Y axis, and the number of pressure sensors is 3 or 5, the detection pressures of the three or five pressure sensors can be calculated in the same manner by resolving the detection pressures into X-axial components and Y-axial components and synthesizing the components. The pointing device 100 may be mounted in a keyboard assembly connected to the system 260 wirelessly or via a cable, or installed in a laptop PC together with a keyboard assembly.

Since the pointing device according to the present invention has various advantages, it can be applied not only to a laptop PC or a keyboard assembly, but to electronic devices in various fields such as a game machine and a machine controller. While the present invention has been described with reference to the specific embodiment shown in the drawings, the present invention is not limited to the embodiment shown in the drawings. It is needless to say that any configuration known so far can be employed as long as the configuration has the effect of the present invention.

As has been described, the present disclosure provides an improved pointing device for moving a cursor on a display of a portable electronic device.

While the disclosure has been particularly shown and described with reference to a preferred embodiment, it will be understood by those skilled in the art that various changes in form and detail may be made therein without departing from the spirit and scope of the disclosure.

What is claimed is:

1. A portable computer comprising:
   a display;
   a keyboard assembly, coupled to said display, having a plurality of key switches; and
   a pointing device located amongst said key switches, wherein said pointing device includes
      a plurality of pressure sensors located below a keyboard plate;
      an operation cap arranged above said keyboard plate;
      a stud for supporting said operation cap and for transmitting a change in pressing force applied to said operation cap to said pressure sensors; and
      a sensor plate arranged below a keyboard plate and fixed to said stud wherein a cushioning material is arranged between said sensor plate and said pressure sensors.

2. The portable computer of claim 1, further comprising a waterproof material located at a gap between said stud and said keyboard plate to prevent liquids from entering via said gap between said stud and said keyboard plate.

3. The portable computer of claim 2, wherein said waterproof material is elastic.

4. The portable computer of claim 1, wherein said stud slides in a pressing direction after said operation cap has been depressed in order to reduce said depressed pressure being applied to said pressure sensors.

5. The portable computer of claim 4, wherein a central, axis of said stud is tilted to increase a detection pressure of one of said pressure sensors from an initial pressure.

6. The portable computer of claim 1, further comprising a screw for fixing said stud from underside of a keyboard plate.

7. A portable computer comprising:
   a display;
   a keyboard assembly, coupled to said display, having a plurality of key switches; and
   a pointing device located amongst said key switches, wherein said pointing device includes
      an operation cap arranged above a keyboard plate;
      a plurality of pressure sensors arranged below said keyboard plate to detect decrements from initial pressures due to a change in pressing force to said operation cap; and
      a controller for generating a moving signal of a mouse cursor from said decrements of said pressure sensors, wherein said controller generates a selection signal in a position of a mouse cursor when said decrements fall within a predetermined range.

8. A portable computer comprising:
   a display;
   a keyboard assembly, coupled to said display, having a plurality of key switches; and
   a pointing device located amongst said key switches, wherein said pointing device includes
      an operation cap arranged above a keyboard plate;
      four pressure sensors arranged in an orthogonal manner located below said keyboard plate to detect decrements from initial pressures due to a change in pressing force to said operation cap; and
      a controller for generating a moving signal of a mouse cursor from said decrements of said pressure sensors.

9. The portable computer of claim 8, wherein said controller extracts two of said pressure sensors with larger decrements in detection pressures of said four pressure sensors to generate said moving signal.

* * * * *